United States Patent
Bathwal et al.

(10) Patent No.: US 10,531,346 B2
(45) Date of Patent: Jan. 7, 2020

(54) TECHNIQUES AND APPARATUSES FOR COMPRESSION ENABLED BEARER MANAGEMENT

(71) Applicant: QUALCOMM Incorporated, San Diego, CA (US)

(72) Inventors: Saket Bathwal, Hyderabad (IN); Gang Xiao, San Diego, CA (US); Shailesh Maheshwari, San Diego, CA (US); Rudhir Upretee, San Diego, CA (US); Srikanth Sallabathula, Bhimavaram (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/912,250

(22) Filed: Mar. 5, 2018

(65) Prior Publication Data
US 2019/0124564 A1    Apr. 25, 2019

(30) Foreign Application Priority Data
Oct. 25, 2017    (IN) .............................. 201741037776

(51) Int. Cl.
*H04W 36/00*    (2009.01)
*H04W 36/02*    (2009.01)
(Continued)

(52) U.S. Cl.
CPC ....... *H04W 36/0072* (2013.01); *H04L 1/1657* (2013.01); *H04L 1/1874* (2013.01);
(Continued)

(58) Field of Classification Search
CPC .... H04L 1/1657; H04L 1/1874; H04W 28/06; H04W 36/00; H04W 36/0072; H04W 36/02; H04W 36/08
See application file for complete search history.

(56) References Cited

U.S. PATENT DOCUMENTS 7,607,062 B2 * 10/2009 Grove ..................... H04L 47/10
                                                      370/474
8,010,861 B2 *  8/2011 Grove ..................... H04L 47/10
                                                      370/474
(Continued)

FOREIGN PATENT DOCUMENTS

CN    102859924 A  *  1/2013    ........... H04L 1/1854
EP       2561637 A1 *  2/2013    ........... H04L 1/1854
(Continued)

OTHER PUBLICATIONS

International Search Report and Written Opinion—PCT/US2018/053973—ISA/EPO—dated Nov. 30, 2018.

*Primary Examiner* — Eric Nowlin
(74) *Attorney, Agent, or Firm* — Harrity & Harrity, LLP

(57) ABSTRACT

Certain aspects of the present disclosure generally relate to wireless communication. In some aspects, a transmitter device may determine a completion of a handover or a radio link failure after transmitting a set of physical data units (PDUs). The transmitter device may retransmit a PDU, of the set of PDUs, after completion of the handover or the radio link failure to enable decompression of the set of PDUs. A receiver device may receive the retransmitted PDU. The receiver device may decompress the set of PDUs based at least in part on receiving the retransmitted PDU. Numerous other aspects are provided.

30 Claims, 11 Drawing Sheets

(51) Int. Cl.
*H04L 1/16* (2006.01)
*H04W 36/08* (2009.01)
*H04L 1/18* (2006.01)
*H04L 29/06* (2006.01)

(52) U.S. Cl.
CPC ........... *H04W 36/02* (2013.01); *H04W 36/08* (2013.01); *H04L 1/1812* (2013.01); *H04L 69/04* (2013.01); *H04W 36/023* (2013.01)

(56) References Cited

U.S. PATENT DOCUMENTS

| | | | | |
|---|---|---|---|---|
| 8,270,348 B2* | 9/2012 | Chun | ................... | H04L 1/1628 370/328 |
| 8,467,349 B2* | 6/2013 | Agashe | ................ | H04L 1/1887 370/331 |
| 8,473,825 B2* | 6/2013 | Burbidge | ............. | H04L 1/1621 714/752 |
| 8,503,478 B2* | 8/2013 | Komatsu | .............. | H04L 1/1835 370/466 |
| 8,594,007 B2* | 11/2013 | Wentink | ................ | H04L 1/1854 370/312 |
| 8,660,068 B2* | 2/2014 | Chun | ................... | H04L 1/1628 370/328 |
| 8,711,780 B2* | 4/2014 | Chun | ................... | H04L 1/1628 370/328 |
| 8,717,871 B2* | 5/2014 | Yasuda | ................... | H04L 1/188 370/216 |
| 8,718,083 B2* | 5/2014 | Li | ........................ | H04L 1/1854 370/329 |
| 8,773,977 B2* | 7/2014 | Yasuda | ................... | H04L 47/34 370/216 |
| 9,380,635 B2* | 6/2016 | Chisu | ................... | H04W 80/06 |
| 9,392,626 B2 | 7/2016 | Paisal et al. | | |
| 9,521,565 B2 | 12/2016 | Tenny et al. | | |
| 9,629,146 B2* | 4/2017 | Yi | ........................ | H04L 1/1887 |
| 9,854,578 B2* | 12/2017 | Yi | ........................ | H04L 1/1887 |
| 9,954,789 B2* | 4/2018 | Basu Mallick | ....... | H04W 28/06 |
| 10,218,484 B2* | 2/2019 | Kanamarlapudi | .... | H04L 5/0055 |
| 2007/0189205 A1* | 8/2007 | Terry | .................... | H04L 1/1812 370/328 |
| 2007/0300120 A1* | 12/2007 | Kim | ...................... | H04L 1/1851 714/749 |
| 2009/0040981 A1* | 2/2009 | Agashe | ................ | H04L 1/1887 370/331 |
| 2009/0086671 A1* | 4/2009 | Pelletier | ............ | H04W 74/0833 370/329 |
| 2009/0203374 A1* | 8/2009 | Chun | ................... | H04L 1/1628 455/425 |
| 2010/0037116 A1* | 2/2010 | Grove | .................. | H04L 47/10 714/749 |
| 2010/0195617 A1* | 8/2010 | Park | ..................... | H04W 36/02 370/331 |
| 2011/0041024 A1* | 2/2011 | Burbidge | ............. | H04L 1/1621 714/749 |
| 2011/0261742 A1* | 10/2011 | Wentink | ............... | H04L 1/1854 370/312 |
| 2011/0286469 A1* | 11/2011 | Yasuda | .................. | H04L 1/1809 370/412 |
| 2011/0292945 A1* | 12/2011 | Yasuda | ................... | H04L 45/00 370/394 |
| 2011/0310895 A1* | 12/2011 | Grove | ..................... | H04L 47/10 370/389 |
| 2012/0142303 A1* | 6/2012 | Komatsu | .............. | H04L 1/1835 455/334 |
| 2012/0236821 A1* | 9/2012 | Yamada | .............. | H04W 36/023 370/331 |
| 2012/0307785 A1* | 12/2012 | Chun | ................... | H04L 1/1628 370/329 |
| 2013/0148640 A1* | 6/2013 | Li | ......................... | H04L 1/1809 370/338 |
| 2013/0176854 A1* | 7/2013 | Chisu | .................. | H04W 80/06 370/241 |
| 2013/0272203 A1* | 10/2013 | Chun | ................... | H04L 1/1628 370/328 |
| 2013/0279379 A1 | 10/2013 | Yang et al. | | |
| 2014/0192822 A1* | 7/2014 | Chun | ................... | H04L 1/1628 370/470 |
| 2016/0080115 A1* | 3/2016 | Josiam | .................. | H04L 5/0094 370/329 |
| 2016/0112925 A1* | 4/2016 | Qin | .................. | H04W 36/0083 370/332 |
| 2016/0142951 A1* | 5/2016 | Balasubramanian | ....................... | H04W 36/023 370/331 |
| 2016/0164793 A1* | 6/2016 | Basu Mallick | ....... | H04W 28/06 370/235 |
| 2016/0183221 A1* | 6/2016 | Yi | ........................ | H04L 1/1887 370/329 |
| 2017/0055283 A1 | 2/2017 | Shrivastava et al. | | |
| 2017/0188344 A1* | 6/2017 | Yi | ........................ | H04L 1/1887 |
| 2017/0353914 A1* | 12/2017 | Jung | .................... | H04W 48/18 |
| 2018/0091278 A1* | 3/2018 | Kanamarlapudi | .... | H04L 5/0055 |
| 2018/0098309 A1* | 4/2018 | Yi | ........................ | H04L 1/1887 |
| 2018/0205661 A1* | 7/2018 | Basu Mallick | ....... | H04W 28/06 |
| 2019/0090156 A1* | 3/2019 | Kim | ..................... | H04W 28/06 |
| 2019/0097952 A1* | 3/2019 | Yong | ................... | H04L 49/9057 |
| 2019/0124564 A1* | 4/2019 | Bathwal | ............. | H04W 36/0072 |
| 2019/0132085 A1* | 5/2019 | Shpiner | ................ | H04L 1/1896 |
| 2019/0159065 A1* | 5/2019 | Kim | ..................... | H04W 28/06 |
| 2019/0268818 A1* | 8/2019 | Yi | ........................ | H04W 76/27 |

FOREIGN PATENT DOCUMENTS

| | | | | |
|---|---|---|---|---|
| EP | 2835925 A1 | 2/2015 | | |
| GB | 2525891 A | 11/2015 | | |
| KR | 20130003030 A | * 1/2013 | ........... | H04L 1/1854 |
| WO | WO-2009038312 A2 | 3/2009 | | |
| WO | WO-2011133938 A1 | * 10/2011 | ........... | H04L 1/1854 |

* cited by examiner

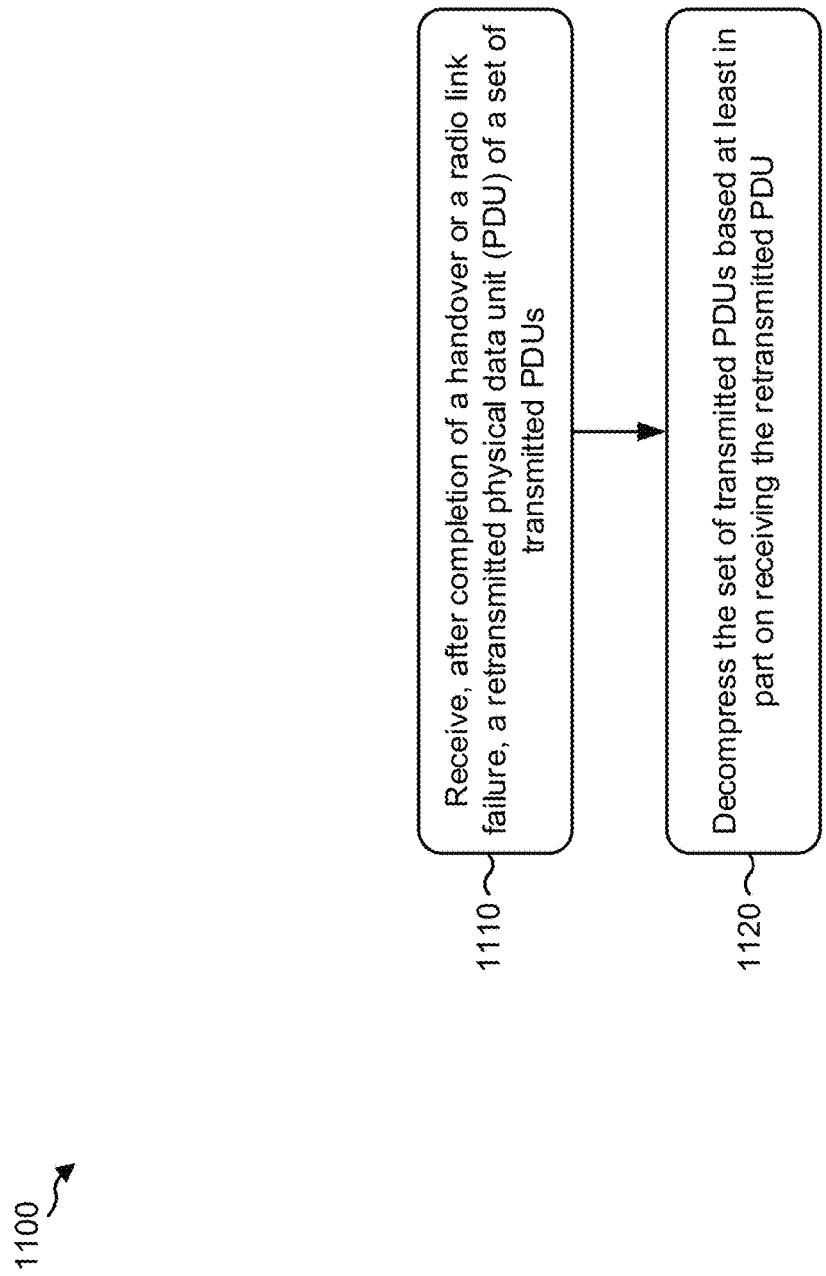

TECHNIQUES AND APPARATUSES FOR COMPRESSION ENABLED BEARER MANAGEMENT

CROSS-REFERENCE TO RELATED APPLICATIONS UNDER 35 U.S.C. § 119

This application claims priority to Indian Patent Application No. 201741037776 filed on Oct. 25, 2017 entitled "TECHNIQUES AND APPARATUSES FOR COMPRESSION ENABLED BEARER MANAGEMENT," which is incorporated by reference herein.

FIELD OF THE DISCLOSURE

Aspects of the present disclosure generally relate to wireless communication, and more particularly to techniques and apparatuses for compression enabled bearer management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include determining a completion of a handover or a radio link failure after transmitting a set of physical data units (PDUs), wherein acknowledgement messages, of a set of acknowledgement messages corresponding to the set of PDUs, are received in an order not sequentially corresponding to the set of PDUs. The method may include retransmitting a PDU, of the set of PDUs, after completion of the handover or the radio link failure to enable decompression of the set of PDUs.

In some aspects, a transmitter device for wireless communication may include memory and one or more processors operatively coupled to the memory. The memory and the one or more processors may be configured to determine a completion of a handover or a radio link failure after transmitting a set of PDUs, wherein acknowledgement messages, of a set of acknowledgement messages corresponding to the set of PDUs, are received in an order not sequentially corresponding to the set of PDUs. The memory and the one or more processors may be configured to retransmit a PDU, of the set of PDUs, after completion of the handover or the radio link failure to enable decompression of the set of PDUs.

In some aspects, a non-transitory computer-readable medium may store one or more instructions for wireless communication. The one or more instructions, when executed by one or more processors of a transmitter device, may cause the one or more processors to determine a completion of a handover or a radio link failure after transmitting a set of PDUs, wherein acknowledgement messages, of a set of acknowledgement messages corresponding to the set of PDUs, are received in an order not sequentially corresponding to the set of PDUs. The one or more instructions, when executed by the one or more processors, may cause the one or more processors to retransmit a PDU, of the set of PDUs, after completion of the handover or the radio link failure to enable decompression of the set of PDUs.

In some aspects, an apparatus for wireless communication may include means for determining a completion of a handover or a radio link failure after transmitting a set of PDUs, wherein acknowledgement messages, of a set of acknowledgement messages corresponding to the set of PDUs, are received in an order not sequentially corresponding to the set of PDUs. The apparatus may include means for retransmitting a PDU, of the set of PDUs, after completion of the handover or the radio link failure to enable decompression of the set of PDUs.

In some aspects, a method of wireless communication may include receiving, after a completion of a handover or a radio link failure, a retransmitted PDU of a set of transmitted PDUs. In some aspects, at least one other PDU, of the set of transmitted PDUs, is received before receiving the retransmitted PDU and a transmitted PDU, of the set of transmitted PDUs and corresponding to the retransmitted PDU, is not received. In some aspects, the retransmitted PDU is provided based at least in part on acknowledgement messages, of a set of acknowledgement messages corresponding to the set of transmitted PDUs, being received in an order not sequentially corresponding to the set of transmitted PDUs. The method may include decompressing the set of transmitted PDUs based at least in part on receiving the retransmitted PDU.

In some aspects, a receiver device for wireless communication may include memory and one or more processors operatively coupled to the memory. The memory and the one or more processors may be configured to receive, after a completion of a handover or a radio link failure, a retransmitted PDU of a set of transmitted PDUs. In some aspects, at least one other PDU, of the set of transmitted PDUs, is received before receiving the retransmitted PDU and a transmitted PDU, of the set of transmitted PDUs and corresponding to the retransmitted PDU, is not received. In some aspects, the retransmitted PDU is provided based at least in part on acknowledgement messages, of a set of acknowledgement messages corresponding to the set of transmitted PDUs, being received in an order not sequentially corresponding to the set of transmitted PDUs. The memory and the one or more processors may be configured to decompress the set of transmitted PDUs based at least in part on receiving the retransmitted PDU.

In some aspects, a non-transitory computer-readable medium may store one or more instructions for wireless communication. The one or more instructions, when executed by one or more processors of a receiver device, may cause the one or more processors to receive, after a completion of a handover or a radio link failure, a retransmitted PDU of a set of transmitted PDUs. In some aspects, at least one other PDU, of the set of transmitted PDUs, is received before receiving the retransmitted PDU and a transmitted PDU, of the set of transmitted PDUs and corresponding to the retransmitted PDU, is not received. In some aspects, the retransmitted PDU is provided based at least in part on acknowledgement messages, of a set of acknowledgement messages corresponding to the set of transmitted PDUs, being received in an order not sequentially corresponding to the set of transmitted PDUs. The one or more instructions, when executed by the one or more processors of the receiver device, may cause the one or more processors to decompress the set of transmitted PDUs based at least in part on receiving the retransmitted PDU.

In some aspects, an apparatus for wireless communication may include means for receiving, after a completion of a handover or a radio link failure, a retransmitted PDU of a set of transmitted PDUs. In some aspects, at least one other PDU, of the set of transmitted PDUs, is received before receiving the retransmitted PDU and a transmitted PDU, of the set of transmitted PDUs and corresponding to the retransmitted PDU, is not received. In some aspects, the retransmitted PDU is provided based at least in part on acknowledgement messages, of a set of acknowledgement messages corresponding to the set of transmitted PDUs, being received in an order not sequentially corresponding to the set of transmitted PDUs. The apparatus may include means for decompressing the set of transmitted PDUs based at least in part on receiving the retransmitted PDU.

Aspects generally include a method, apparatus, device, computer program product, non-transitory computer-readable medium, transmitter device, receiver device, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a receiver device, in accordance with various aspects of the present disclosure.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
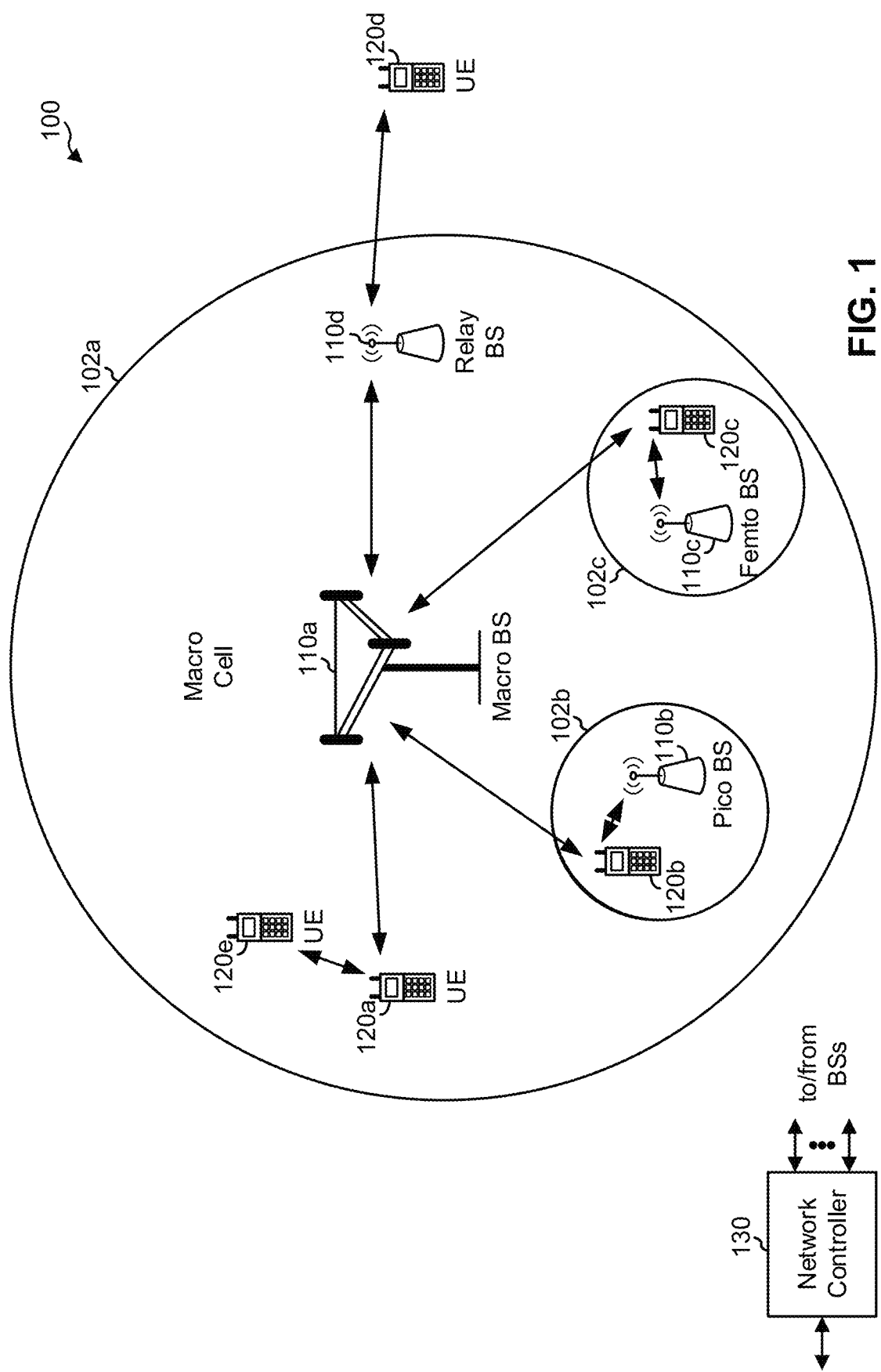
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network)

via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
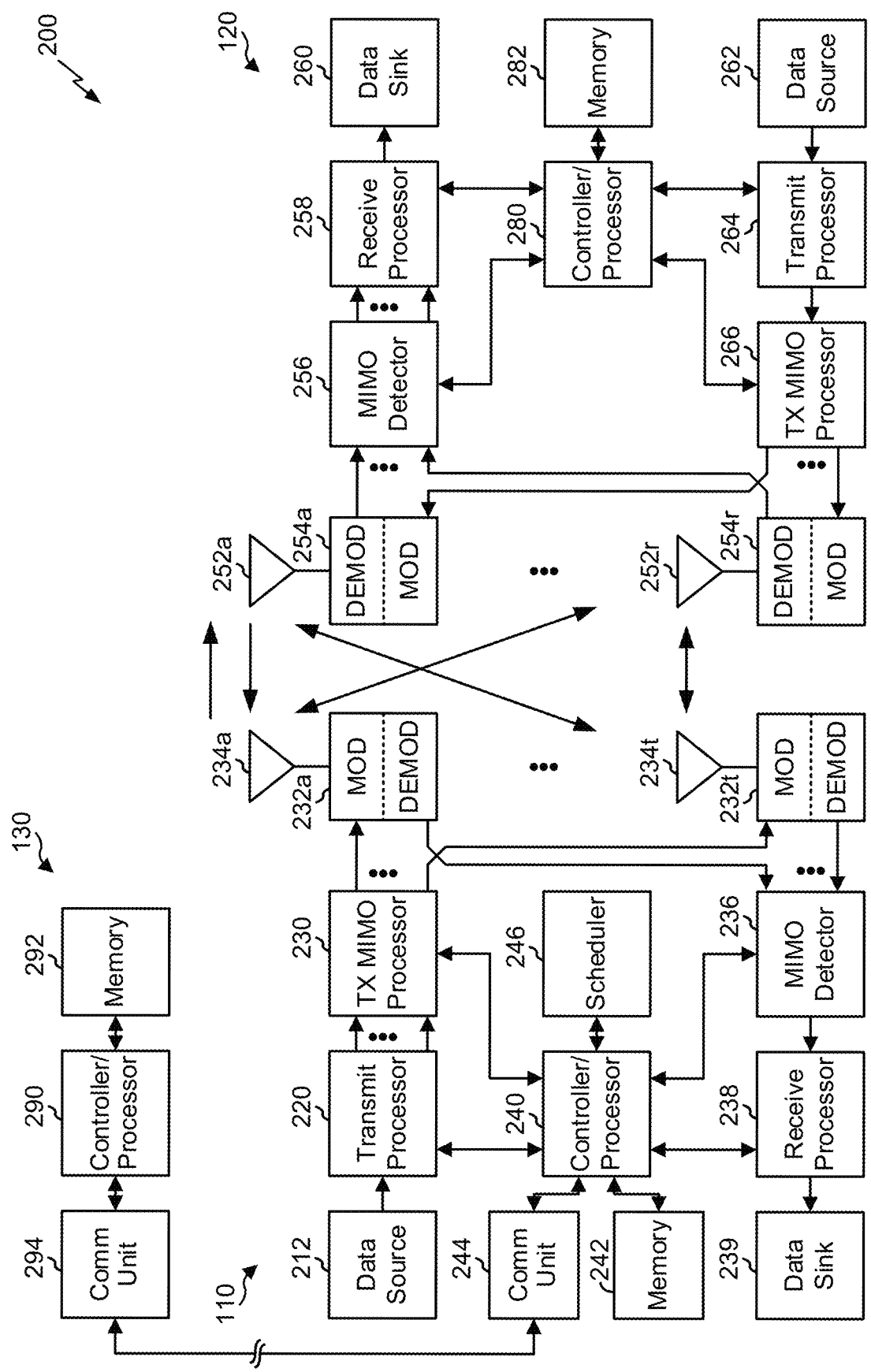
FIG. 2 is a block diagram conceptually illustrating an example of a base station in communication with a user equipment (UE) in a wireless communication network, in accordance with certain aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with compression enabled bearer management, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. A scheduler 246 may schedule UEs for data transmission on the downlink and/or uplink.

In some aspects, a transmitter device, such as UE 120 or BS 110, may include means for determining a completion of a handover or a radio link failure after transmitting a set of PDUs, means for retransmitting a PDU, of the set of PDUs, after completion of the handover or the radio link failure to enable decompression of the set of PDUs, and/or the like. In some aspects, such means may include one or more components of UE 120 or BS 110 described in connection with FIG. 2.

In some aspects, a receiver device, such as UE 120 or BS 110, may include means for receiving, after a completion of a handover or a radio link failure, a retransmitted PDU of a set of transmitted PDUs, means for decompressing the set of transmitted PDUs based at least in part on receiving the retransmitted PDU, and/or the like. In some aspects, such means may include one or more components of UE 120 or BS 110 described in connection with FIG. 2.

As indicated above, FIG. 2 is provided merely as an example. Other examples are possible and may differ from what was described with regard to FIG. 2.

Figure 3:
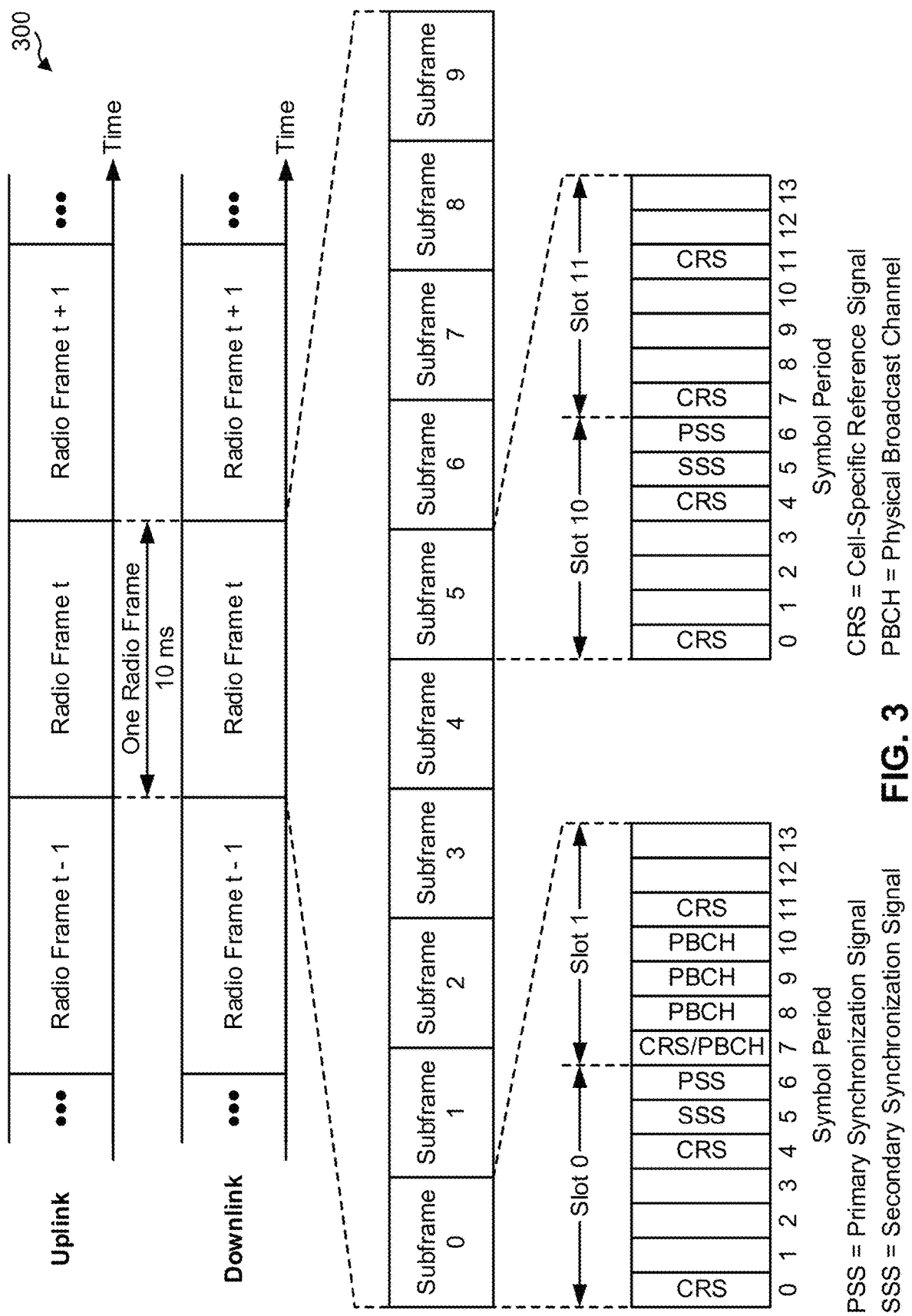
FIG. 3 is a block diagram conceptually illustrating an example of a frame structure in a wireless communication network, in accordance with certain aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such as NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
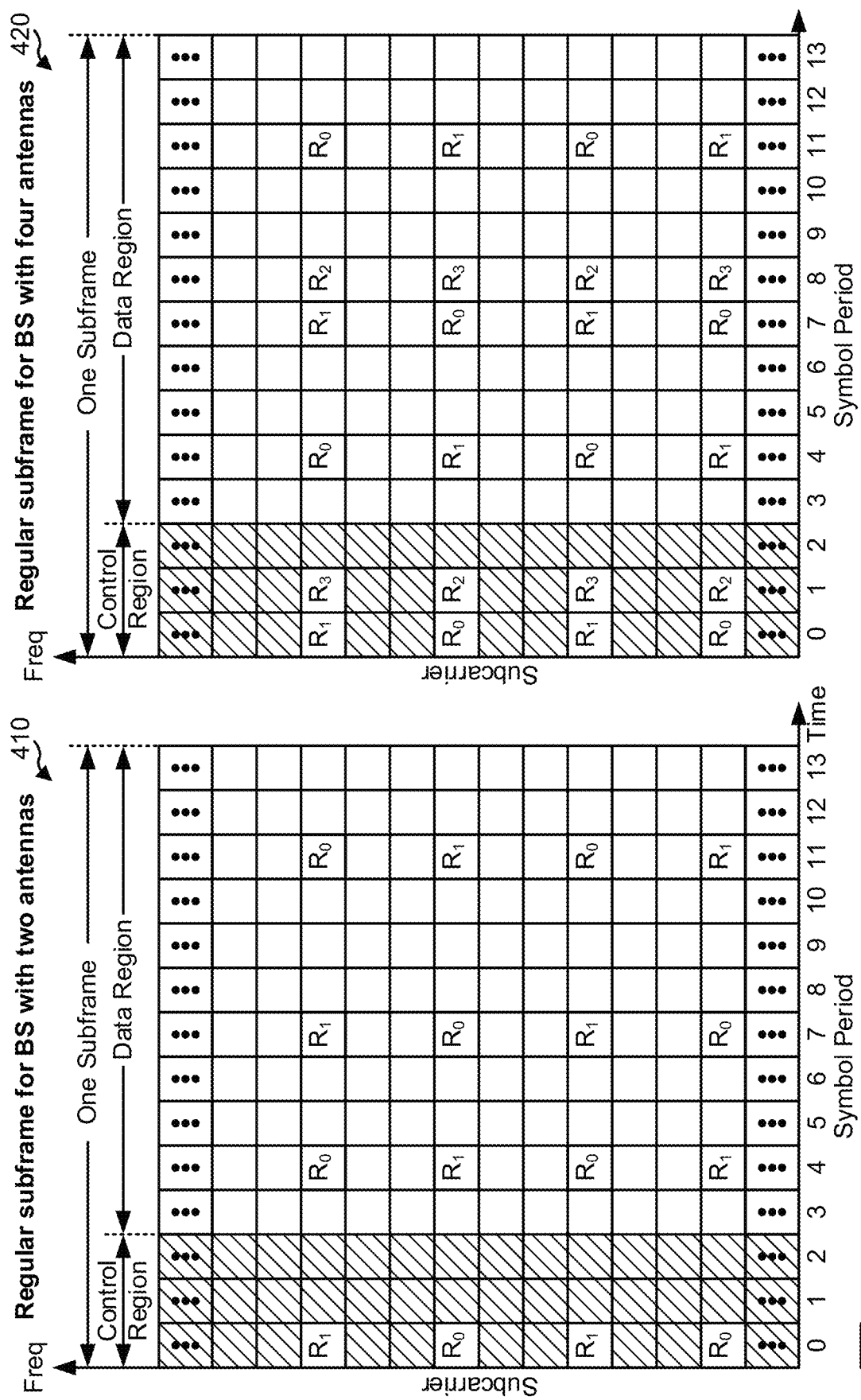
FIG. 4 is a block diagram conceptually illustrating two example subframe formats with the normal cyclic prefix, in accordance with certain aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification (TS) 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include downlink/uplink (DL/UL) data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
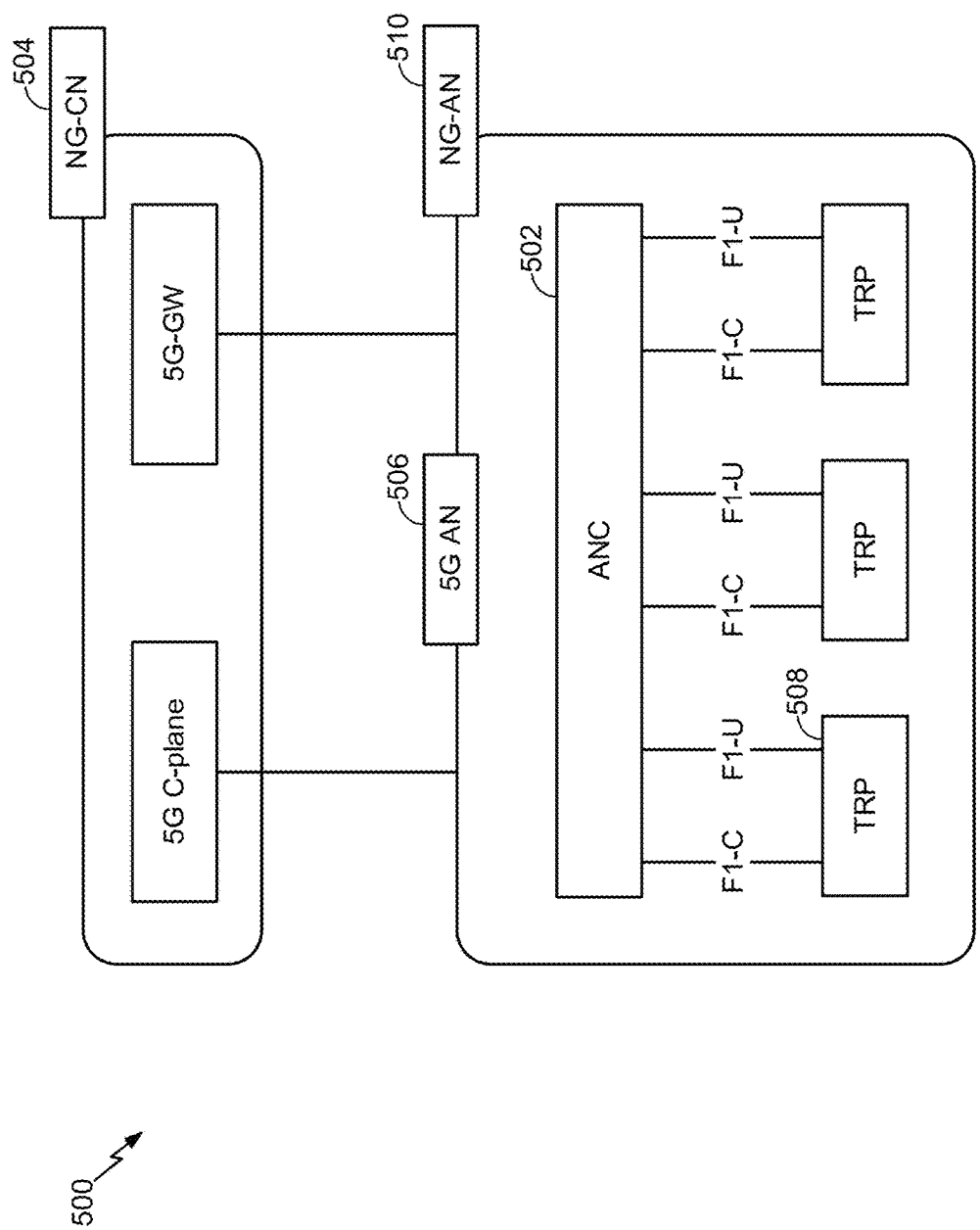
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
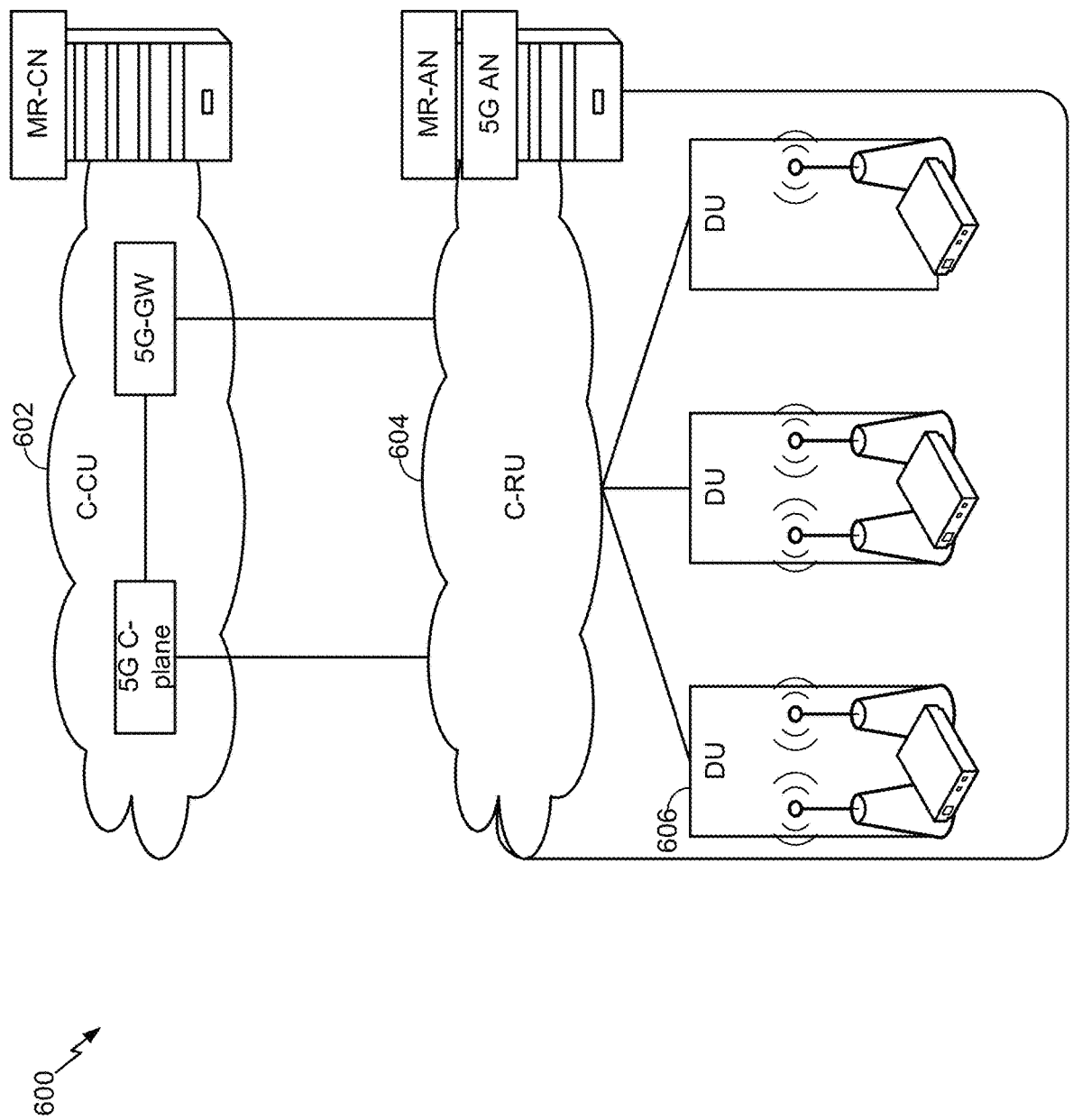
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

A transmitter device, such as a UE, a BS, and/or the like, may compress a group of packets, and may transmit the group of compressed packets to a receiver device, such as another UE, another BS, and/or the like. The receiver device may receive the group of compressed packets, and may decompress the group of compressed packets. For compression algorithms, such as uplink data compression (UDC), robust header compression (ROHC), and/or the like, decompression may be enabled for the receiver device when compressed packet data units (PDUs) of a single bearer are delivered to the receiver device in the same sequential order as transmission by the transmitter device. In this case, when a PDU is lost and not received by the receiver device, a compression memory of the receiver device may become out of synchronization with a compression memory of the transmitter device. When the compression memory of the receiver device is out of synchronization with the compression memory of the transmitter device, the receiver device may be unable to successfully decompress one or more subsequent received PDUs.

The transmitter device and the receiver device may use a radio link control (RLC) acknowledged mode (AM mode) for performing transmission control protocol (TCP) based transmission for Internet traffic. The receiver device may provide RLC acknowledgement messages for received PDUs and RLC negative acknowledgement messages for lost PDUs that are not received. Based at least in part on receiving an RLC acknowledgement of one or more received PDUs, the transmitter device may abandon storage of the one or more received PDUs, thereby conserving memory resources.

After transmitting RLC acknowledgement and RLC negative acknowledgement messages, the receiver device may fail to decompress one or more received PDUs based at least in part on desynchronization of a compression memory of the receiver device in connection with not receiving and decompressing one or more lost PDUs. After a handover or a radio link failure (RLF), the receiver device may request retransmission of the one or more lost PDUs and the one or more received PDUs that were not successfully decompressed. However, based at least in part on the transmitter device abandoning storage of the one or more received PDUs after receiving the RLC acknowledgement messages from the receiver device, the transmitter device may be unable to retransmit the one or more received PDUs.

In some compression enabled bearers, a PDU may be transmitted as an uncompressed PDU. For example, after a first, compressed PDU is lost, resulting in a compression memory of the transmitter device and the receiver device losing synchronization, a subsequently transmitted second, uncompressed PDU may still be received and decoded as a result of the second PDU not requiring decompression. After a handover or an RLF, a transmitter device may recompress the first PDU for retransmission, recompress the second PDU for retransmission, and compress one or more third PDUs for initial transmission. After performing compression, the transmitter device may receive a PDCP status report associated with resynchronizing compression memories of the transmitter device and the receiver device.

The PDCP status report may identify a missing sequence number associated with the first PDU, and may include information indicating that the second PDU was successfully received and decoded. The transmitter device may determine not to retransmit the second PDU as a compressed PDU based at least in part on receiving the PDCP status report. However, based at least in part on having already compressed the second PDU, compression memories of the transmitter device and the receiver device may lose synchronization when the second PDU is dropped and not retransmitted. In this case, the receiver device may be unable to successfully decompress the one or more third PDUs.

Some aspects, described herein, may perform compression enabled bearer management. For example, a transmitter device may determine completion of a handover or radio link failure, and may retransmit at least one PDU, of a set of PDUs, to enable decompression of the set of PDUs. In some aspects, the transmitter device may maintain storage of a PDU after receiving an acknowledgement message for the PDU when the acknowledgement message is not received in sequence with one or more other acknowledgement messages corresponding to one or more other PDUs. In this way, the transmitter device may retransmit the PDU to enable decompression of the PDU after a decompression failure.

Moreover, in some aspects, described herein, the transmitter device may receive a status report message for which successfully decoded PDUs are omitted or may disregard successfully decoded PDUs identified in the status report message. In this way, the transmitter device may avoid dropping successfully decoded PDUs from a compression memory, thereby maintaining compression memory synchronization with the receiver device. In this way, the transmitter device enables transmission via a compression enabled bearer management with improved throughput, reduced packet loss, reduced utilization of computing resources, reduced utilization of memory resources, and/or the like relative to performing TCP level retransmission to compensate for lost PDUs or PDUs associated with a decompression failure.

Figure 7:
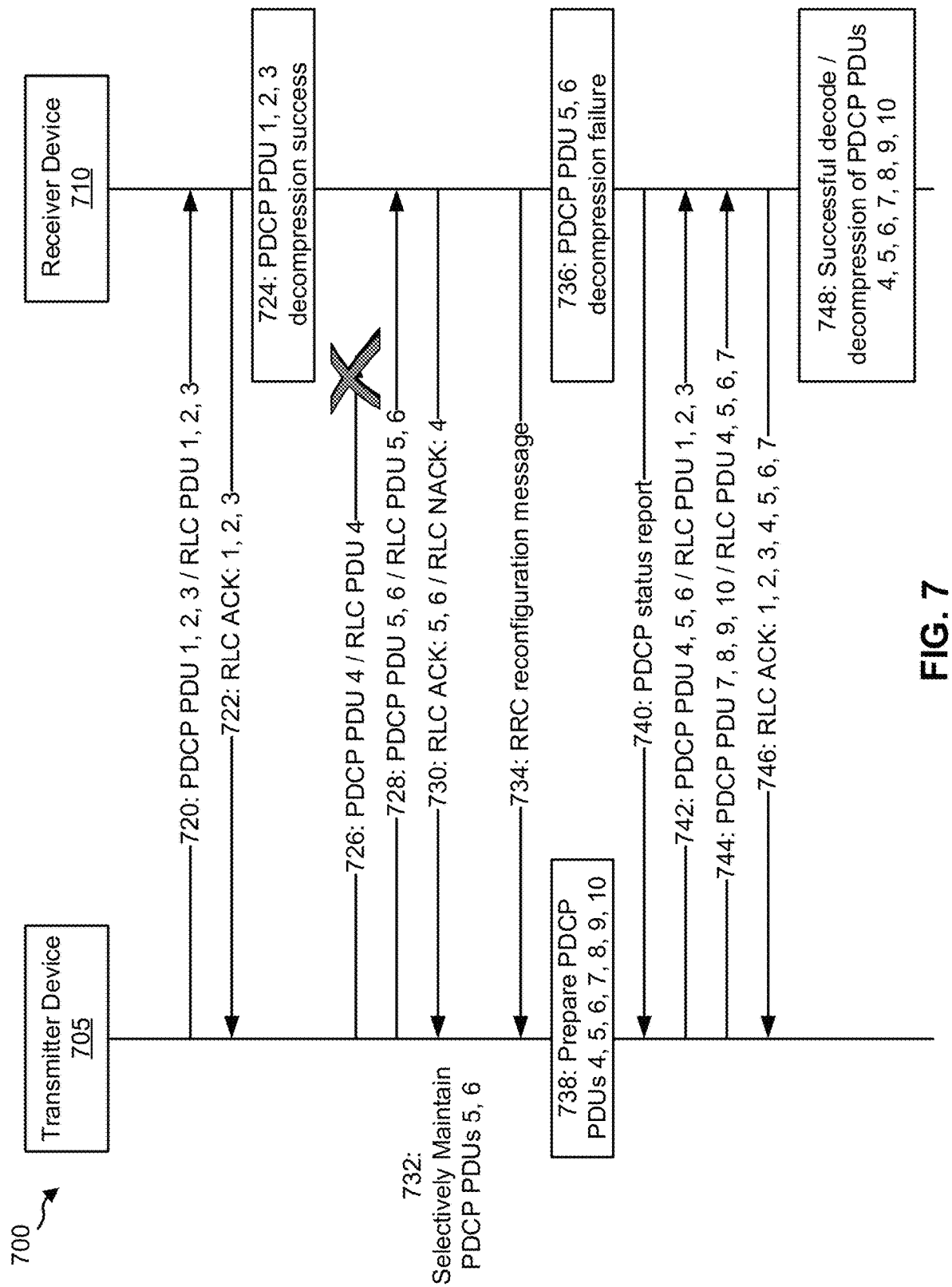
FIG. 7 is a diagram illustrating an example of compression enabled bearer management, in accordance with various aspects of the present disclosure.

FIG. 7 is a diagram illustrating an example 700 of compression enabled bearer management, in accordance with various aspects of the present disclosure. As shown in FIG. 7, example 700 includes a transmitter device 705, which may correspond to BS 110, UE 120, and/or the like, and a receiver device 710, which may correspond to BS 110, UE 120, and/or the like.

As further shown in FIG. 7, and by reference number 720, transmitter device 705 may transmit a set of PDCP PDUs 1, 2, and 3 and a corresponding set of RLC PDUs 1, 2, 3 from a compressed buffer and via a compression enabled bearer.

As further shown in FIG. 7, and by reference number 722, transmitter device 705 may receive, from receiver device 710, one or more RLC acknowledgement messages (RLC ACK) identifying RLC PDUs 1, 2, and 3 corresponding to PDCP PDUs 1, 2, and 3. For example, based at least in part on successfully receiving PDCP PDUs 1, 2, and 3, and RLC PDUs 1, 2, and 3, receiver device 710 may transmit one or more RLC acknowledgement messages to indicate receipt. In this case, transmitter device 705 may abandon storage of PDCP PDUs 1, 2, and 3 based at least in part on receiving corresponding RLC acknowledgement messages in an order of transmission of PDCP PDUs 1, 2, 3.

As further shown in FIG. 7, and by reference number 724, based at least in part on receiving PDCP PDUs 1, 2, and 3 in a same sequence as PDCP PDUs 1, 2, and 3 were transmitted by transmitter device 705, receiver device 710 may successfully decompress PDCP PDUs 1, 2, and 3. In this way, transmitter device 705 and receiver device 710 may communicate via a compression enabled bearer.

As further shown in FIG. 7, and by reference number 726, transmitter device 705 may transmit a compressed PDCP PDU 4 and a corresponding RLC PDU 4, and the compressed PDCP PDU 4 and RLC PDU 4 may fail to be received by receiver device 710, such as based at least in part on interference, based at least in part on a network error, and/or the like.

As further shown in FIG. 7, and by reference number 728, transmitter device 705 may transmit compressed PDCP PDUs 5 and 6 and corresponding RLC PDUs 5 and 6, which may each be received by receiver device 710.

As further shown in FIG. 7, and by reference number 730, transmitter device 705 may receive, from receiver device 710, another RLC acknowledgement message and an RLC negative acknowledgement message (RLC NACK). For example, receiver device 710 may transmit an acknowledgement message for RLC PDUs 5 and 6 and a negative acknowledgement message for RLC PDU 4 based at least in part on receiving RLC PDUs 5 and 6 and not receiving RLC PDU 4. In this case, the RLC acknowledgement message and the RLC negative acknowledgement message are transmitted before receiver device 710 attempts to decompress PDCP PDUs 5 and 6.

As further shown in FIG. 7, and by reference number 732, transmitter device 705 may selectively maintain storage of PDCP PDUs 5 and 6 after receiving the RLC acknowledgement message for RLC PDUs 5 and 6. For example, when RLC acknowledgement messages for each RLC PDU are not received in a sequence corresponding to a transmission sequence of each PDCP PDU, transmitter device 705 may maintain storage of PDCP PDUs 5 and 6 in a memory. In this way, transmitter device 705 may enable retransmission of PDCP PDUs 5 and 6 after a decompression failure for PDCP PDUs 5 and 6. Additionally, or alternatively, based at least in part on the acknowledgement messages being received in sequence, transmitter device 705 may abandon one or more PDCP PDUs. In this way, transmitter device 705 reduces a memory utilization when PDCP PDUs are to be successfully decompressed relative to maintaining all PDCP PDUs.

As further shown in FIG. 7, and by reference number 734, transmitter device 705 may receive, from receiver device 710, an RRC reconfiguration message. For example, transmitter device 705 may receive an RRC reconfiguration message associated with performing a handover, and transmitter device 705 may be handed over. Additionally, or alternatively, transmitter device 705 may receive an RRC reconfiguration message based at least in part on undergoing a radio link failure.

As further shown in FIG. 7, and by reference number 736, based at least in part on successfully receiving the PDCP PDUs 5 and 6 and failing to successfully receive PDCP PDU 4, receiver device 710 may fail to decompress PDCP PDUs 5 and 6. For example, based at least in part on a compression memory of receiver device 710 being out of synchronization with a compression memory of transmitter device 705 in connection with failing to receive PDCP PDU 4, receiver device 710 may be unable to successfully decompress PDCP PDUs 5 and 6.

As further shown in FIG. 7, and by reference number 738, transmitter device 705 may prepare another set of PDCP PDUs for transmission. For example, transmitter device 705 may recompress PDCP PDUs 4, 5, 6 for retransmission and may compress PDCP PDUs 7, 8, 9, and 10 for transmission. In this way, transmitter device 705 reduces a utilization of network resources relative to retransmitting PDCP PDUs 4, 5, and 6 uncompressed. Alternatively, transmitter device 705 may compress PDCP PDUs 7, 8, and 9, and may determine to transmit PDCP PDUs 4, 5, and 6 as uncompressed PDUs, thereby reducing processing resources relative to recompressing PDCP PDUs 4, 5, and 6 for transmission.

As further shown in FIG. 7, and by reference number 740, transmitter device 705 may receive, from receiver device 710, a PDCP status report. For example, receiver device 710 may provide the PDCP status report to transmitter device 705 to indicate that a PDCP sequence number corresponding to PDCP PDU 4 is missing (e.g., not received by receiver device 710). In this way, receiver device 710 may trigger retransmission of PDCP PDUs 4, 5, and 6.

As further shown in FIG. 7, and by reference number 742, transmitter device 705 may retransmit PDCP PDUs 4, 5, and 6 and RLC PDUs 1, 2, and 3, which may be successfully received by receiver device 710.

As further shown in FIG. 7, and by reference number 744, transmitter device 705 may transmit PDCP PDUs 7, 8, 9, and 10 and RLC PDUs 4, 5, 6, and 7, which may be successfully received by receiver device 710.

As further shown in FIG. 7, and by reference number 746, transmitter device 705 may receive, from receiver device 710, an RLC acknowledgement message for RLC PDUs 1, 2, 3, 4, 5, 6, and 7.

As further shown in FIG. 7, and by reference number 748, receiver device 710 may successfully decode and/or decompress PDCP PDUs 4, 5, 6, 7, 8, 9, and 10. For example, based at least in part on PDCP PDUs 4, 5, 6, 7, 8, 9, and 10 being transmitted as compressed PDCP PDUs, receiver device 710 may decompress PDCP PDUs 4, 5, 6, 7, 8, 9, and 10 successfully. Additionally, or alternatively, based at least in part on PDCP PDUs 4, 5, and 6 being retransmitted as uncompressed PDCP PDUs, and PDCP PDUs 7, 8, 9, and 10 being transmitted as compressed PDCP PDUs, receiver device 710 may successfully decompress PDCP PDUs 7, 8, 9, and 10. In this case, receiver device 710 may decode PDCP PDUs 4, 5, 6, 7, 8, 9, and 10 based at least in part on receiving and/or decompressing PDCP PDUs 4, 5, 6, 7, 8, 9, and 10.

As indicated above, FIG. 7 is provided as an example. Other examples are possible and may differ from what was described with respect to FIG. 7.

Figure 8:
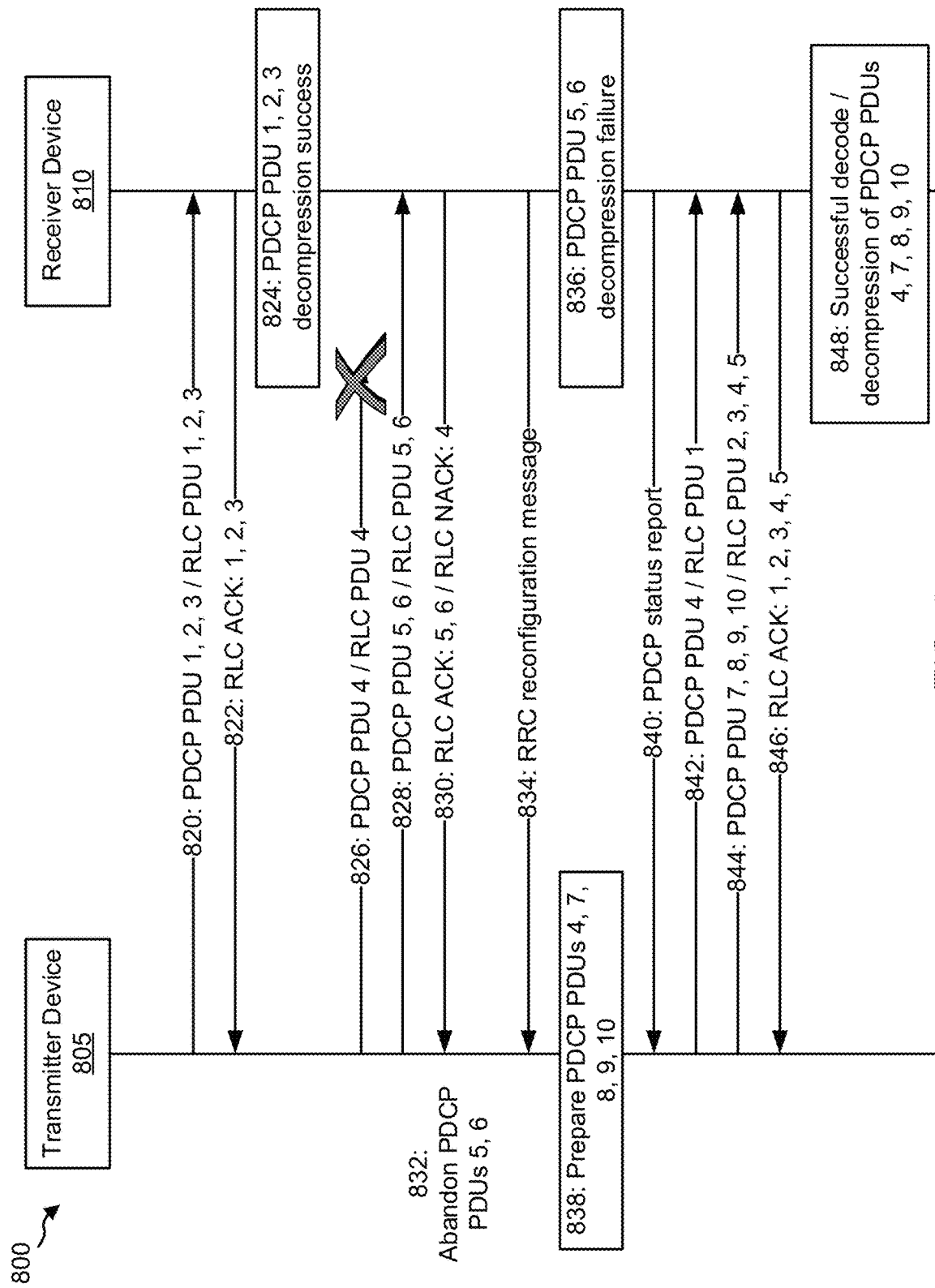
FIG. 8 is a diagram illustrating an example of compression enabled bearer management, in accordance with various aspects of the present disclosure.

FIG. 8 is a diagram illustrating an example 800 of compression enabled bearer management, in accordance with various aspects of the present disclosure. As shown in FIG. 8, example 800 includes a transmitter device 805, which may correspond to BS 110, UE 120, and/or the like, and a receiver device 810, which may correspond to BS 110, UE 120, and/or the like.

As further shown in FIG. 8, and by reference number 820, transmitter device 805 may transmit a set of PDCP PDUs 1, 2, and 3 and a corresponding set of RLC PDUs 1, 2, 3. As shown by reference number 822, transmitter device 805 may receive, from receiver device 810, RLC acknowledgement messages identifying RLC PDUs 1, 2, and 3. In this case, transmitter device 805 may abandon storage of PDCP PDUs 1, 2, and 3 based at least in part on receiving RLC acknowledgement messages identifying RLC PDUs 1, 2, and 3 in the order of transmission of PDCP PDUs 1, 2, and 3. As shown by reference number 824, based at least in part on receiving PDCP PDUs 1, 2, and 3 in a same order as transmission of PDCP PDUs 1, 2, and 3, receiver device 810 may successfully decompress PDCP PDUs 1, 2, and 3.

As further shown in FIG. 8, and by reference number 826, transmitter device 805 may transmit compressed PDCP PDU 4 and RLC PDU 4, which may fail to be received by receiver device 810. As shown by reference number 828, transmitter device 805 may transmit compressed PDCP PDUs 5 and 6 and corresponding RLC PDUs 5 and 6, which may be received by receiver device 810. As shown by reference number 830, transmitter device 805 may receive, from receiver device 810, acknowledgement messages for RLC PDUs 5 and 6 and a negative acknowledgement message for RLC PDU 4.

As further shown in FIG. 8, and by reference number 832, transmitter device 805 may abandon storage of PDCP PDUs 5 and 6. For example, transmitter device 805 may flush PDCP PDUs 5 and 6 from a memory. As shown by reference number 834, transmitter device 805 may receive, from receiver device 810, an RRC reconfiguration message associated with performing a handover, and transmitter device 805 may be handed over. Additionally, or alternatively, transmitter device 805 may receive, from receiver device 810, an RRC reconfiguration message based at least in part on undergoing a radio link failure.

As further shown in FIG. 8, and by reference number 836, based at least in part on successfully receiving the PDCP PDUs 5 and 6 and failing to successfully receive PDCP PDU 4, receiver device 810 may fail to decompress PDCP PDUs 5 and 6.

As further shown in FIG. 8, and by reference number 838, transmitter device 805 may prepare PDCP PDUs 4, 7, 8, 9, and 10 for transmission. For example, transmitter device 805 may compress PDCP PDUs 7, 8, 9, and 10 for transmission as compressed PDCP PDUs, and may determine to retransmit PDCP PDU 4 as an uncompressed PDCP PDU. In this way, transmitter device 805 may allow for TCP loss with recovery using TCP retransmission of PDCP PDUs 5 and 6, but may improve utilization of memory resources by reducing a likelihood of maintaining PDCP PDUs in a memory when a handover (or RLF) does not occur. Moreover, based at least in part on retransmitting PDCP PDU 4 as an uncompressed PDCP PDU, transmitter device 805 reduces utilization of processing resources relative to compressing PDCP PDU 4.

As further shown in FIG. 8, and by reference number 840, transmitter device 805 may receive, from receiver device 810, a PDCP status report. As shown by reference number 842, transmitter device 805 may retransmit PDCP PDU 4 and RLC PDU 1, which may be successfully received by receiver device 810. As shown by reference number 844, transmitter device 805 may transmit PDCP PDUs 7, 8, 9, and 10 and RLC PDUs 2, 3, 4, and 5, which may be successfully received by receiver device 810.

As further shown in FIG. 8, and by reference number 846, transmitter device 805 may receive, from receiver device 810, an RLC acknowledgement message for RLC PDUs 1, 2, 3, 4, 5. As shown by reference number 848, receiver device 810 may successfully receive and/or decompress PDCP PDUs 4, 7, 8, 9, and 10. For example, based at least in part on PDCP PDU 4 being retransmitted as an uncompressed PDCP PDU, and PDCP PDUs 7, 8, 9, and 10 being transmitted as compressed PDCP PDUs, receiver device 810 may successfully decompress PDCP PDUs 7, 8, 9, and 10.

As indicated above, FIG. 8 is provided as an example. Other examples are possible and may differ from what was described with respect to FIG. 8.

Figure 9:
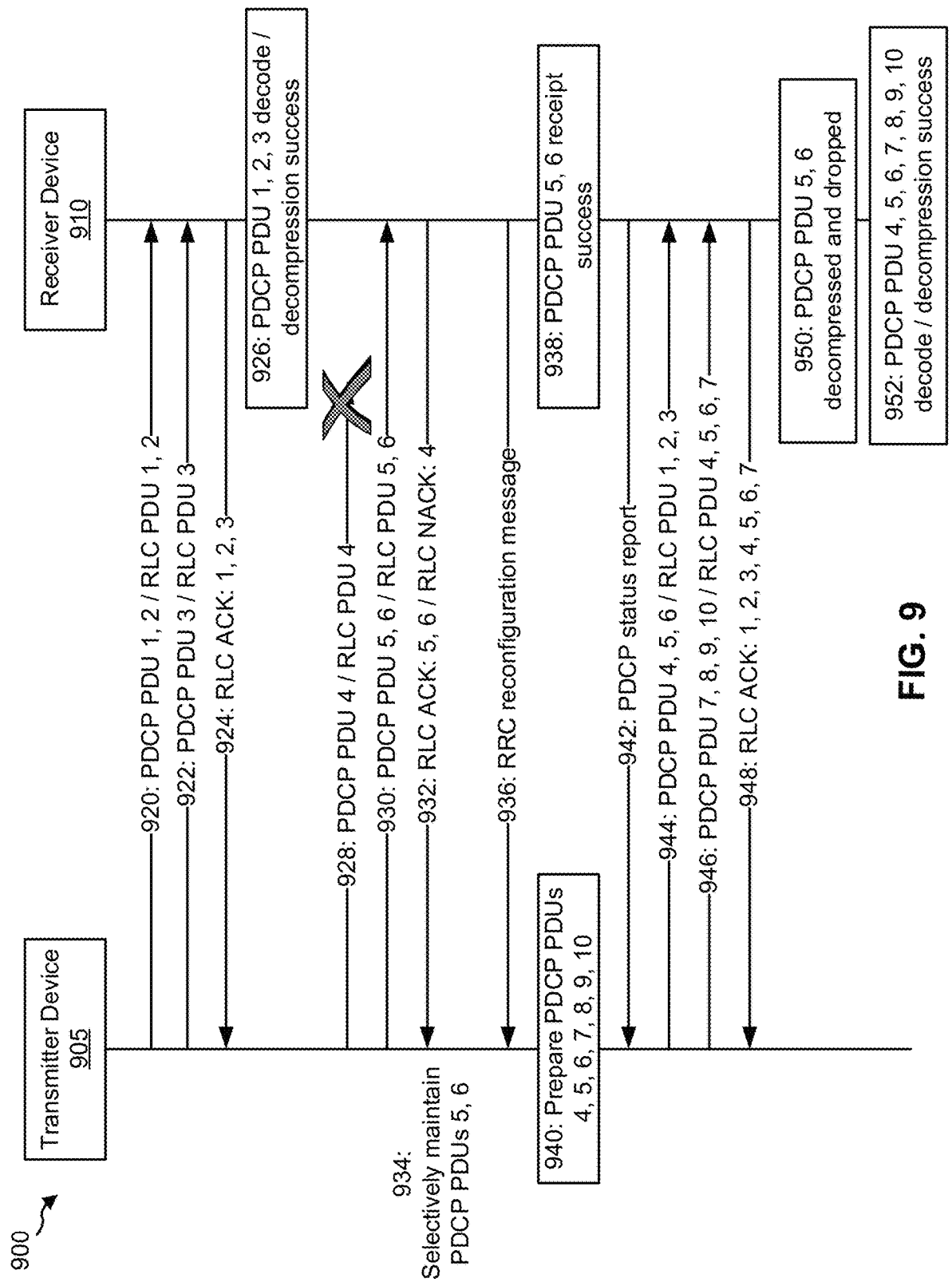
FIG. 9 is a diagram illustrating an example of compression enabled bearer management, in accordance with various aspects of the present disclosure.

FIG. 9 is a diagram illustrating an example 900 of compression enabled bearer management, in accordance with various aspects of the present disclosure. As shown in FIG. 9, example 900 includes a transmitter device 905, which may correspond to BS 110, UE 120, and/or the like, and a receiver device 910, which may correspond to BS 110, UE 120, and/or the like.

As further shown in FIG. 9, and by reference number 920, transmitter device 905 may transmit a set of PDCP PDUs 1 and 2 as compressed PDCP PDUs and a corresponding set of RLC PDUs 1 and 2. As shown by reference number 922, transmitter device 905 may transmit an uncompressed PDCP PDU 3 and a corresponding RLC PDU 3.

As further shown in FIG. 9, and by reference number 924, transmitter device 905 may receive, from receiver device 910, one or more RLC acknowledgement messages identifying RLC PDUs 1, 2, and 3. In this case, transmitter device 905 may abandon storage of PDCP PDUs 1, 2, and 3 based at least in part on the one or more RLC acknowledgement messages indicating that PDCP PDUs 1 and 2 were received in an order of transmission and that PDCP PDU 3 was successfully received.

As further shown in FIG. 9, and by reference number 926, based at least in part on receiving compressed PDCP PDUs 1 and 2 and uncompressed PDCP PDU 3, receiver device 910 may successfully decompress PDCP PDUs 1 and 2, and may decode PDCP PDUs 1, 2, and 3. As shown by reference number 928, transmitter device 905 may transmit a compressed PDCP PDU 4 and RLC PDU 4, which may fail to be received by receiver device 910. As shown by reference number 930, transmitter device 905 may transmit uncompressed PDCP PDUs 5 and 6 and corresponding RLC PDUs 5 and 6, which may each be received by receiver device 910.

As further shown in FIG. 9, and by reference number 932, transmitter device 905 may receive, from receiver device 910, an acknowledgement message for RLC PDUs 5 and 6 and a negative acknowledgement message for RLC PDU 4 based at least in part on receiver device 910 receiving RLC PDUs 5 and 6 and not receiving RLC PDU 4. In this case, based at least in part on transmitter device 905 transmitting PDCP PDUs 5 and 6 as uncompressed PDCP PDUs, PDCP PDUs 5 and 6 can be decoded by receiver device 910 despite a compression memory of receiver device 910 being out of synchronization with transmitter device 905 in connection with receiver device 910 failing to receive compressed PDCP PDU 4.

As further shown in FIG. 9, and by reference number 934, transmitter device 905 may selectively maintain PDCP PDUs 5 and 6 in a memory. For example, when acknowledgement messages for PDCP PDUs 5 and 6 are received in sequence, transmitter device 905 may abandon PDCP PDUs 5 and 6 by flushing PDCP PDUs 5 and 6 from a memory. Additionally, or alternatively, when the acknowledgement messages are not received in sequence, such as when a negative acknowledgement message is provided for PDCP PDU 4, transmitter device 905 may maintain PDCP PDUs 5 and 6 in a memory, thereby enabling retransmission to enable successful decompression by receiver device 910 of subsequent PDCP PDUs.

As further shown in FIG. 9, and by reference number 936, transmitter device 905 may receive, from receiver device 910, an RRC reconfiguration message associated with performing a handover, and transmitter device 905 may be handed over. Additionally, or alternatively, transmitter device 905 may receive, from receiver device 810, an RRC reconfiguration message based at least in part on undergoing a radio link failure. As shown by reference number 938, receiver device 910 may successfully decode PDCP PDUs 5 and 6 based at least in part on PDCP PDUs 5 and 6 being uncompressed. As shown by reference number 940, transmitter device 905 may recompress PDCP PDUs 4, 5, 6 and may compress PDCP PDUs 7, 8, 9, and 10 for transmission, thereby reducing a utilization of network resources relative to retransmitting PDCP PDUs 4, 5, and 6 uncompressed.

As further shown in FIG. 9, and by reference number 942, transmitter device 905 may receive, from receiver device 910, a PDCP status report. For example, receiver device 910 may provide the PDCP status report to transmitter device 905 to indicate that a PDCP sequence number corresponding to PDCP PDU 4 is missing (e.g., not received by receiver device 910), to enable resynchronization of compression memories of transmitter device 905 and receiver device 910. In this case, receiver device 910 may omit information identifying PDCP PDUs 5 and 6 from the PDCP status report. In this case, based at least in part on transmitter device 905 not receiving information identifying PDCP PDUs 5 and 6 as successfully decoded in the PDCP status report, transmitter device 905 may not be triggered to drop PDCP PDUs 5 and 6 from a compression memory, and may be triggered to retransmit PDCP PDUs 5 and 6. Additionally, or alternatively, receiver device 910 may include the information identifying PDCP PDUs 5 and 6 in the PDCP status report, and transmitter device 905 may determine to retransmit PDCP PDUs 5 and 6 despite PDCP PDUs 5 and 6 being successfully decoded. In this way, transmitter device 905 and receiver device 910 avoid losing compression memory synchronization after a handover and/or radio link failure.

As further shown in FIG. 9, and by reference number 944, transmitter device 905 may retransmit PDCP PDU 4, duplicate PDCP PDUs 5 and 6, and RLC PDUs 1, 2, and 3, which may be successfully received by receiver device 910, based at least in part on receiver device 910 omitting information identifying PDCP PDUs 5 and 6 from the PDCP status report or based at least in part on transmitter device 905 determining to transmit PDCP PDUs 5 and 6 despite having received the PDCP status report that includes information identifying PDCP PDUs 5 and 6. As shown by reference number 946, transmitter device 905 may transmit PDCP PDUs 7, 8, 9, and 10 and RLC PDUs 4, 5, 6, and 7, which may be successfully received by receiver device 910.

As further shown in FIG. 9, and by reference number 948, transmitter device 905 may receive, from receiver device 910, an RLC acknowledgement message for RLC PDUs 1, 2, 3, 4, 5, 6, and 7. As shown by reference number 950, receiver device 910 may decompress and drop PDCP PDUs 5 and 6 based at least in part on PDCP PDUs 5 and 6 being duplicates of the previously received and decoded PDCP PDUs 5 and 6. As shown by reference number 952, receiver device 910 may successfully decompress PDCP PDUs 7, 8, 9, and 10 and decode PDCP PDUs 4, 5, 6, 7, 8, 9, and 10.

As indicated above, FIG. 9 is provided as an example. Other examples are possible and may differ from what was described with respect to FIG. 9.

Figure 10:
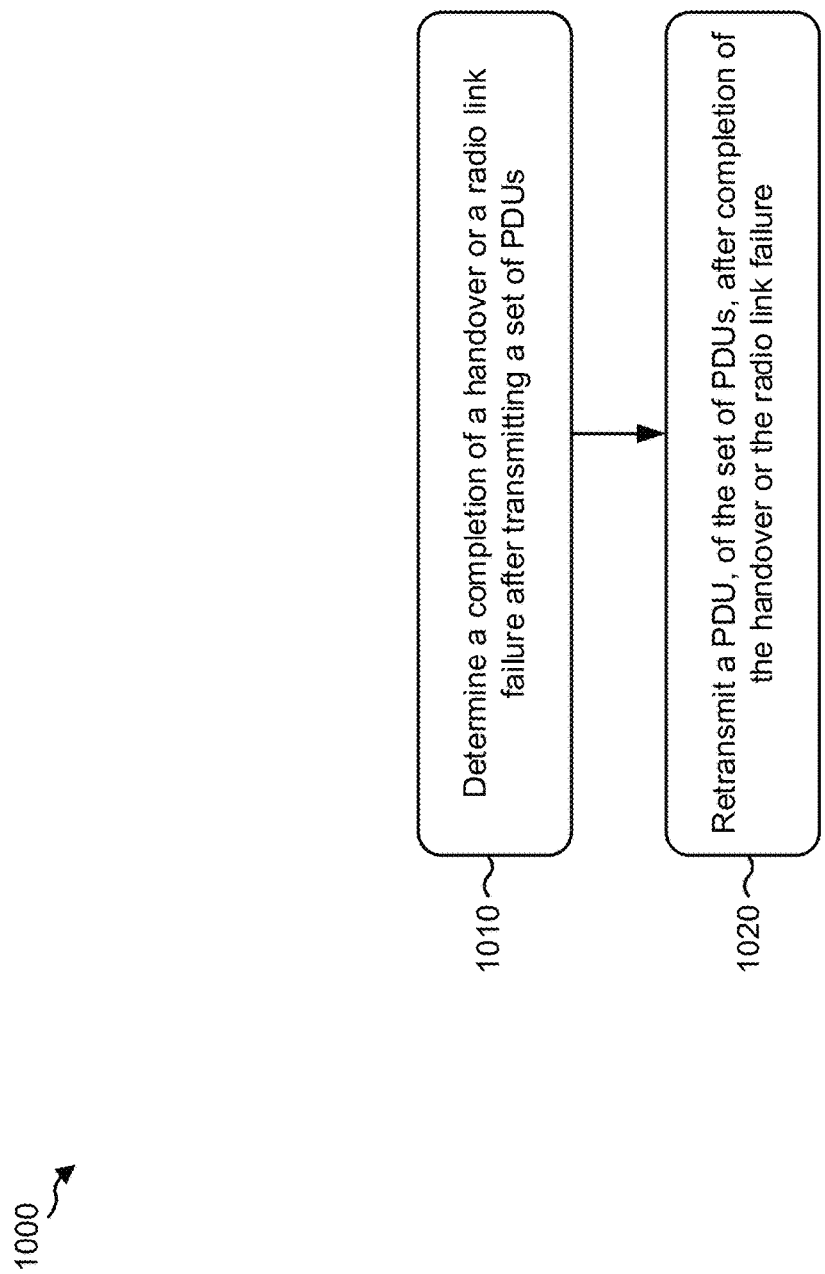
FIG. 10 is a diagram illustrating an example process performed, for example, by a transmitter device, in accordance with various aspects of the present disclosure.

FIG. 10 is a diagram illustrating an example process 1000 performed, for example, by a transmitter device, in accordance with various aspects of the present disclosure. Example process 1000 is an example where a transmitter device (e.g., BS 110, UE 120, transmitter device 705, transmitter device 805, transmitter device 905, and/or the like) performs compression enabled bearer management.

As shown in FIG. 10, in some aspects, process 1000 may include determining a completion of a handover or a radio link failure after transmitting a set of PDUs (block 1010). For example, the transmitter device (e.g., using transmit processor 220, receive processor 238, controller/processor 240, receive processor 258, transmit processor 264, controller/processor 280, and/or the like) may determine the completion of the handover or the radio link failure after transmitting a set of PDUs, as described above. In some aspects, acknowledgement messages, of a set of acknowledgement messages corresponding to the set of PDUs, may be received in an order not sequentially corresponding to the set of PDUs.

As shown in FIG. 10, in some aspects, process 1000 may include retransmitting a PDU, of the set of PPDs, after completion of the handover or the radio link failure (block 1020). For example, the transmitter device (e.g., using transmit processor 220, TX MIMO processor 230, modulator 232, antenna 234, transmit processor 264, TX MIMO processor 266, modulator 254, antenna 252, and/or the like) may retransmit the PDU, of the set of PDUs, after completion of the handover or the radio link failure to enable decompression of the set of PDUs, as described above.

Process 1000 may include additional aspects, such as any single aspect or any combination of aspects described below.

In some aspects, the transmitter device may maintain storage of the PDU after receiving the acknowledgement messages in the order not sequentially corresponding to the set of PDUs. In some aspects, the transmitter device may abandon storage of another PDU after receiving the acknowledgement messages in the order not sequentially corresponding to the set of PDUs. In some aspects, the retransmitted PDU may be compressed.

In some aspects, the retransmitted PDU may be uncompressed. In some aspects, the PDU may be an unacknowledged PDU. In some aspects, the transmitter device may receive a status report message, wherein the status report message does not include an acknowledgement sequence number corresponding to a successfully decoded PDU of the set of PDUs transmitted before the handover or the radio link failure, and retransmitting the successfully decoded PDU as a duplicate compressed PDU to synchronize a compression memory. In some aspects, the transmitter device may receive a status report message, wherein the status report message includes an acknowledgement sequence number corresponding to a successfully decoded PDU of the set of PDUs transmitted before the handover or the radio link failure, and retransmitting the successfully decoded PDU as a duplicate compressed PDU to synchronize a compression memory.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a receiver device, in accordance with various aspects of the present disclosure. Example process 1100 is an example where a receiver device (e.g., BS 110, UE 120, receiver device 710, receiver device 810, receiver device 910, and/or the like) performs compression enabled bearer management.

As shown in FIG. 11, in some aspects, process 1100 may include receiving, after a completion of a handover or a radio link failure, a retransmitted PDU of a set of transmitted PDUs (block 1110). For example, the receiver (e.g., using receive processor 238, MIMO detector 236, demodulator 232, antenna 234, receive processor 258, MIMO detector 256, demodulator 254, antenna 252, and/or the like) may receive, after the completion of the handover or the radio link failure, the retransmitted PDU of the set of transmitted PDUs, as described above. In some aspects, at least one other PDU, of the set of transmitted PDUs, is received before receiving the retransmitted PDU and a transmitted PDU, of the set of transmitted PDUs and corresponding to the retransmitted PDU, is not received. In some aspects, the retransmitted PDU is provided based at least in part on acknowledgement messages, of a set of acknowledgement messages corresponding to the set of transmitted PDUs, being received in an order not sequentially corresponding to the set of transmitted PDUs.

As shown in FIG. 11, in some aspects, process 1100 may include decompressing the set of transmitted PDUs based at least in part on receiving the retransmitted PDU (block 1120). For example, the receiver (e.g., using controller/processor 240, receive processor 238, MIMO detector 236, demodulator 232, antenna 234, controller/processor 280, receive processor 258, MIMO detector 256, demodulator 254, antenna 252, and/or the like) may decompress the set of transmitted PDUs based at least in part on receiving the retransmitted PDU, as described above.

Process 1100 may include additional aspects, such as any single aspect or any combination of aspects described below.

In some aspects, the retransmitted PDU is provided based at least in part on the transmitted PDU being stored after the acknowledgement messages are received in the order not sequentially corresponding to the set of transmitted PDUs. In some aspects, storage of another PDU is abandoned after the acknowledgement messages are received in the order not sequentially corresponding to the set of transmitted PDUs. In some aspects, the retransmitted PDU is compressed. In some aspects, the retransmitted PDU is uncompressed. In some aspects, the retransmitted PDU is an unacknowledged PDU.

In some aspects, the receiver may provide a status report message, the status report may not include an acknowledgement sequence number corresponding to a successfully decoded PDU, of the set of transmitted PDUs, transmitted before the handover or the radio link failure, and the receiver may receive the successfully decoded PDU as a duplicate compressed PDU to synchronize a compression memory. In some aspects, the receiver may provide a status report, the status report may include an acknowledgement sequence number corresponding to a successfully decoded PDU, of the set of transmitted PDUs, transmitted before the handover or the radio link failure, and the receiver may receive the successfully decoded PDU as a duplicate compressed PDU to synchronize a compression memory.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   determining a completion of a handover or a radio link failure after transmitting a set of physical data units (PDUs),
      wherein acknowledgement messages, of a set of acknowledgement messages corresponding to the set of PDUs, are received in an order not sequentially corresponding to the set of PDUs, and
      wherein the acknowledgement messages include:
         a first acknowledgement message for a first PDU of the set of PDUs, and
         a second acknowledgement message for a second PDU of the set of PDUs;
   maintaining storage of the first PDU and the second PDU when the acknowledgement messages are received in the order not sequentially corresponding to the set of PDUs; and
   retransmitting the first PDU and the second PDU after completion of the handover or the radio link failure to enable decompression of the set of PDUs.

2. The method of claim 1, further comprising:
   abandoning storage of another PDU after receiving the acknowledgement messages in the order not sequentially corresponding to the set of PDUs.

3. The method of claim 1, wherein the first PDU is compressed when the first PDU is retransmitted.

4. The method of claim 1, wherein the first PDU is uncompressed when the first PDU is retransmitted.

5. The method of claim 1, wherein another PDU, of the set of PDUs, is an unacknowledged PDU.

6. The method of claim 1, further comprising:
   receiving a status report message,
      wherein the status report message does not include an acknowledgement sequence number corresponding to a successfully decoded PDU of the set of PDUs transmitted before the handover or the radio link failure; and
   wherein the retransmitting comprises:
      retransmitting the successfully decoded PDU as a duplicate compressed PDU to synchronize a compression memory.

7. The method of claim 1, further comprising:
receiving a status report message,
wherein the status report message includes an acknowledgement sequence number corresponding to a successfully decoded PDU of the set of PDUs transmitted before the handover or the radio link failure; and
wherein the retransmitting comprises:
retransmitting the successfully decoded PDU as a duplicate compressed PDU to synchronize a compression memory.

8. A transmitter device for wireless communication, comprising:
memory; and
one or more processors coupled to the memory, the memory and the one or more processors configured to:
determine a completion of a handover or a radio link failure after transmitting a set of physical data units (PDUs),
wherein acknowledgement messages, of a set of acknowledgement messages corresponding to the set of PDUs, are received in an order not sequentially corresponding to the set of PDUs, and
wherein the acknowledgement messages include:
a first acknowledgement message for a first PDU of the set of PDUs, and
a second acknowledgement message for a second PDU of the set of PDUs;
maintain storage of the first PDU and the second PDU when the acknowledgement messages are received in the order not sequentially corresponding to the set of PDUs; and
retransmit the first PDU and the second PDU after completion of the handover or the radio link failure to enable decompression of the set of PDUs.

9. The transmitter device of claim 8, wherein the memory and the one or more processors are further configured to:
abandon storage of another PDU after receiving the acknowledgement messages in the order not sequentially corresponding to the set of PDUs.

10. The transmitter device of claim 8, wherein the first PDU is compressed when the first PDU is retransmitted.

11. The transmitter device of claim 8, wherein the first PDU is uncompressed when the first PDU is retransmitted.

12. The transmitter device of claim 8, wherein another PDU, of the set of PDUs, is an unacknowledged PDU.

13. The transmitter device of claim 8, wherein the memory and the one or more processors are further configured to:
receive a status report message,
wherein the status report message does not include an acknowledgement sequence number corresponding to a successfully decoded PDU of the set of PDUs transmitted before the handover or the radio link failure; and
wherein the memory and the one or more processors, when configured to retransmit, are configured to:
retransmit the successfully decoded PDU as a duplicate compressed PDU to synchronize a compression memory.

14. The transmitter device of claim 8, wherein the memory and the one or more processors are further configured to:
receive a status report message,
wherein the status report message includes an acknowledgement sequence number corresponding to a successfully decoded PDU of the set of PDUs transmitted before the handover or the radio link failure; and
wherein the memory and the one or more processors, when configured to retransmit, are configured to:
retransmit the successfully decoded PDU as a duplicate compressed PDU to synchronize a compression memory.

15. A method of wireless communication performed by a receiver device, comprising:
receiving, after a completion of a handover or a radio link failure, a first retransmitted physical data unit (PDU) of a set of transmitted PDUs and a second retransmitted PDU of the set of transmitted PDUs,
wherein at least one other PDU, of the set of transmitted PDUs, is received before receiving the retransmitted PDU and a transmitted PDU, of the set of transmitted PDUs and corresponding to the retransmitted PDU, is not received,
wherein the first retransmitted PDU and the second retransmitted PDU are provided based at least in part on acknowledgement messages, of a set of acknowledgement messages corresponding to the set of transmitted PDUs, being received in an order not sequentially corresponding to the set of transmitted PDUs,
wherein the acknowledgement messages include:
a first acknowledgement message for the first transmitted PDU of the set of transmitted PDUs, and
a second acknowledgement message for a second transmitted PDU of the set of transmitted PDUs, and
wherein storage of the first transmitted PDU and the second transmitted PDU is maintained when the acknowledgement messages are received in the order not sequentially corresponding to the set of PDUs; and
decompressing the set of transmitted PDUs based at least in part on receiving the first retransmitted PDU and the second retransmitted PDU.

16. The method of claim 15, wherein the first retransmitted PDU is provided based at least in part on the first transmitted PDU being stored after the acknowledgement messages are received in the order not sequentially corresponding to the set of transmitted PDUs.

17. The method of claim 15, wherein storage of another PDU is abandoned after the acknowledgement messages are received in the order not sequentially corresponding to the set of transmitted PDUs.

18. The method of claim 15, wherein the first retransmitted PDU is compressed when the first retransmitted PDU is retransmitted.

19. The method of claim 15, wherein the first retransmitted PDU is uncompressed when the first retransmitted PDU is retransmitted.

20. The method of claim 15, wherein another PDU is an unacknowledged PDU when the other PDU is retransmitted.

21. The method of claim 15, further comprising:
providing a status report message,
wherein the status report message does not include an acknowledgement sequence number corresponding to a successfully decoded PDU, of the set of transmitted PDUs, transmitted before the handover or the radio link failure; and
wherein the receiving comprises:
receiving the successfully decoded PDU as a duplicate compressed PDU to synchronize a compression memory.

22. The method of claim 15, further comprising:
providing a status report message, wherein the status report message includes an acknowledgement sequence number corresponding to a successfully decoded PDU, of the set of transmitted PDUs, transmitted before the handover or the radio link failure; and wherein the receiving comprises:
receiving the successfully decoded PDU as a duplicate compressed PDU to synchronize a compression memory.

23. A receiver device for wireless communication, comprising:

memory; and one or more processors coupled to the memory, the memory and the one or more processors configured to:
receive, after a completion of a handover or a radio link failure, a first retransmitted physical data unit (PDU) of a set of transmitted PDUs and a second retransmitted PDU of the set of transmitted PDUs,
wherein at least one other PDU, of the set of transmitted PDUs, is received before receiving the retransmitted PDU and a transmitted PDU, of the set of transmitted PDUs and corresponding to the retransmitted PDU, is not received,
wherein the first retransmitted PDU and the second retransmitted PDU are provided based at least in part on acknowledgement messages, of a set of acknowledgement messages corresponding to the set of transmitted PDUs, being received in an order not sequentially corresponding to the set of transmitted PDUs,
wherein the acknowledgement messages include:
a first acknowledgement message for the first transmitted PDU of the set of transmitted PDUs, and
a second acknowledgement message for a second transmitted PDU of the set of transmitted PDUs, and
wherein storage of the first transmitted PDU and the second transmitted PDU is maintained when the acknowledgement messages are received in the order not sequentially corresponding to the set of PDUs; and
decompress the set of transmitted PDUs based at least in part on receiving the first retransmitted PDU and the second retransmitted PDU.

24. The receiver device of claim 23, wherein the first retransmitted PDU is provided based at least in part on the first transmitted PDU being stored after the acknowledgement messages are received in the order not sequentially corresponding to the set of transmitted PDUs.

25. The receiver device of claim 23, wherein storage of another PDU is abandoned after the acknowledgement messages are received in the order not sequentially corresponding to the set of transmitted PDUs.

26. The receiver device of claim 23, wherein the first retransmitted PDU is compressed when the first retransmitted PDU is retransmitted.

27. The receiver device of claim 23, wherein the first retransmitted PDU is uncompressed when the first retransmitted PDU is retransmitted.

28. The receiver device of claim 23, wherein another PDU is an unacknowledged PDU when the other PDU is retransmitted.

29. The receiver device of claim 23, wherein the one or more processors are further configured to:
provide a status report message.

30. The receiver device of claim 29, wherein:
the status report message does not include an acknowledgement sequence number corresponding to a successfully decoded PDU, of the set of transmitted PDUs, transmitted before the handover or the radio link failure, or
the status report message includes an acknowledgement sequence number corresponding to a successfully decoded PDU, of the set of transmitted PDUs, transmitted before the handover or the radio link failure.

* * * * *